US007519568B2

(12) United States Patent
Wright et al.

(10) Patent No.: US 7,519,568 B2
(45) Date of Patent: Apr. 14, 2009

(54) PLAYBOOK AUTOMATION (75) Inventors: Travis A. Wright, Everett, WA (US);
Dale S Koetke, Redmond, WA (US);
James M Pinkerton, Bellevue, WA (US); Baelson B. Duque, Redmond, WA (US); Brett P Eddy, Poulsbo, WA (US)

(73) Assignee: Microsoft Corporation, Redmond, WA (US)

( * ) Notice: Subject to any disclaimer, the term of this patent is extended or adjusted under 35 U.S.C. 154(b) by 713 days.

(21) Appl. No.: 11/103,303

(22) Filed: Apr. 11, 2005

(65) Prior Publication Data
US 2006/0229846 A1    Oct. 12, 2006

(51) Int. Cl.
*G06N 5/00* (2006.01)
(52) U.S. Cl. .................................. 706/47; 706/45
(58) Field of Classification Search .................. 706/47, 706/45
See application file for complete search history.

(56) References Cited

U.S. PATENT DOCUMENTS 4,881,230 A * 11/1989 Clark et al. ................. 714/712
6,006,016 A * 12/1999 Faigon et al. ................. 714/48
7,373,552 B2 * 5/2008 Bjorsne ........................ 714/37
2002/0161874 A1 * 10/2002 McGuire ..................... 709/223
2003/0128991 A1 * 7/2003 Carling et al. ................. 399/8
2004/0024739 A1 * 2/2004 Copperman et al. ............ 707/1
2004/0243343 A1  12/2004 Nelson et al.

OTHER PUBLICATIONS

Halasz et al. "JETA: A Knowledge-Based Approach to Aircraft Gas Turbine Engine Maintenance", 1992. Kluwer Academic Publishers. Journal of Applied Intelligence. pp. 25-46.*
PCT Search Report for PCT Application No. PCT/US 06/08106, mailed Sep. 28, 2007 (7 pages).

* cited by examiner

*Primary Examiner*—Wilbert L Starks, Jr.
(74) *Attorney, Agent, or Firm*—Lee & Hayes, PLLC (57) ABSTRACT

Systems and methods for playbook automation are described. In one aspect, a user selects operational knowledge associated with an application. The user associates one or more playbook-based tasks, playbook-based views, or playbook-based links with the operational knowledge. The playbook-based tasks, playbook-based views, and playbook-based links are for diagnosing, resolving, and/or verifying a problem associated with the application. The systems and methods generate an integrated management pack from the associated operational knowledge and at least one of the one or more playbook-based tasks, playbook-based views, or playbook-based links.

20 Claims, 11 Drawing Sheets

🗔 Ping

⊟ Results: Status = ✓ Complete

Pinging WG-SQL-01.WG.com [10.194.197.101] with 32 bytes of data:

Reply from 10.194.197.101: bytes=32 time<1ms TTL=128

Reply from 10.194.197.101: bytes=32 time<1ms TTL=128

Reply from 10.194.197.101: bytes=32 time<1ms TTL=128

Reply from 10.194.197.101: bytes=32 time<1ms TTL=128

Ping statistics for 10.194.197.101:

Packets: Sent = 4, Received = 4, Lost = 0 (0% loss),

Approximate round trip times in milli-seconds:

Minimum = 0ms, Maximum = 0ms, Average = 0ms

Administrator UI
122

Task Search Results

| Name | Path | Type | Run Location | Usage | Score |
|---|---|---|---|---|---|
| Check for Blocking Processes | SQL Server\Performance | Script | Agent | 62 | ★★★★☆ |
| Check for SQL Best Practice C... | SQL Server\Performance | Command Line | Agent | 5 | ★★★★☆ |
| Check Database Query Perfor... | SQL Server\Performance | Command Line | Agent | 13 | ★★★★☆ |
| Stop SQL Agent | SQL Server\Performance | Command Line | Agent | 6 | ★★★★☆ |
| Display Global Configuration S | SQL Server\Performance | Script | Agent | 12 | ★★★☆☆ |
| Terminate Blocking Process | SQL Server\Performance | Command Line | Agent | 9 | ★★★★☆ |
| Run SQL Server Query Analyze | SQL Server\Performance | Command Line | Console | 34 | ★★★☆☆ |
| Run SQL Server Profile (defau... | SQL Server\Performance | Command Line | Console | 22 | ★★★☆☆ |
| Trace Route | Common Tasks\Network | Command Line | Management Server | 3 | ★★☆☆☆ |
| Ping | Common Tasks\Network | Command Line | Management Server | 6 | ★★☆☆☆ |

Task Details: Check for Blocking Processes

Properties | Rules | Feedback

☐ Feedback posted on 6/28/2004 at 2:28:16 PM by Glen Davis | ★★★★☆

This task is great for identifying blocking processes. I think we should automate this one so that we can unblock pending transactions as fast as possible without waiting for an Operator to intervene. ⎯⎯ 132-1

Rule: <u>SQL Query Performance</u>
Path: <u>SQL Server\Performance</u>

☐ Feedback posted on 2/1/2004 at 12:32:14 PM by Fred Smith | ★★★★☆

I've used this task successfully, but blocked processes are not always the issue. Be sure to check for latency over the network to the db. ⎯⎯ 132-2

Rule: <u>SQL Query Performance</u>
Path: <u>SQL Server\Performance</u>

Fig. 12

PLAYBOOK AUTOMATION

TECHNICAL FIELD

The systems and methods of this specification relate to computer system management.

BACKGROUND

Organizations rely on IT services to support business requirements. Failure to meet service levels due to system or server downtime can translate into a potential for lost revenue, customer dissatisfaction, and a competitive disadvantage. Operations management systems help IT administrators maintain system availability and service performance requirements by reducing the complexity typically associated with managing today's scalable server IT infrastructure environments. For instance, operations management systems directly monitor infrastructure events, health, and performance, and provide this information to operations team members. This information along with diagnostic tools, typically provided by management pack(s) and/or operations playbooks, allow operations team members (e.g., administrators and operators) to diagnose and resolve issues that arise. Management packs generally include operational knowledge to manage applications. Third parties such as the application developers typically provide operational knowledge. The operational knowledge encapsulates the knowledge, experience, and suggested practices to keep these applications operational. For example, operational knowledge associated with an alert may provide a summary of a recognized problem, cause(s) of the problem, and suggested resolution(s).

Independent of a management pack, an operations team, based on their collective experience, may generate an operations playbook ("playbook"). A playbook typically includes one or more resources such as descriptions of how one would manually run a task using a script or a command line, how to use performance monitoring tools, a reporting tool (e.g., state, diagram, alert, performance, event, computer and group views), etc.), and/or specify links for additional resources. Since playbooks are independent of management packs, playbooks cannot used in context of the operational knowledge provided by a developer of the application or by a system vendor for the application. Moreover, playbooks are not integrated into an operations management system such as Microsoft Operations Manager (MOM), or the like.

SUMMARY

Systems and methods for playbook automation are described. In one aspect, a user selects operational knowledge associated with an application. The user associates one or more playbook-based tasks, playbook-based views, or playbook-based links with the operational knowledge. The playbook-based tasks, playbook-based views, and playbook-based links are for diagnosing, resolving, and/or verifying a problem associated with the application. The systems and methods generate an integrated management pack from the associated operational knowledge and at least one of the one or more playbook-based tasks, playbook-based views, or playbook-based links.

BRIEF DESCRIPTION OF THE DRAWINGS

In the Figures, the left-most digit of a component reference number identifies the particular Figure in which the component first appears.

DETAILED DESCRIPTION

Overview

As a management entity becomes familiar with a central store of operational knowledge, the entity should be able to utilize an integrated operations management infrastructure to automate problem resolution operations. However, existing management pack and operations playbook problem diagnosis, resolution, and/or verification resources are not integrated with respect to one another. Additionally playbooks do not allow for selective automation of tasks. Use and maintenance of non-integrated operations management tools typically increases operational costs and results in inherent operational inefficiencies. For example, when a management entity wants to use operations playbook resources to diagnose and resolve an application problem, existing operational management systems do not provide the entity with capability to use those tasks within the context of the application's operational knowledge typically provided by a management pack. This is inefficient.

Additionally, there is no underlying infrastructure in a playbook to carry out any initiated playbook action (task) on managed devices/computers. In other words, playbook tasks are not actionable directly from the playbook. To make the playbook task actionable, a user must interface with a different tool such as an operations management system. This is also inefficient. To make matters worse, non-integrated management pack and operations playbook resources make it difficult for operations team members to leverage operational experience across these varied resources for continual improvement of efficiency of the IT operations.

The systems and methods for playbook automation integrate playbooks and their associated information, tasks, reporting tools, links, and/or other resources, with contextually associated operational knowledge from a management pack, into an operations management infrastructure. The integrated resources form an integrated management pack. While interfacing with resources associated with an integrated management pack, the systems and methods facilitate gathering and dissemination of feedback from operations management team members and others to generate historical data sets. The historical data sets allow administrators and developers to determine usefulness of substantially all associated aspects of the integrated management pack.

An Exemplary System

Although not required, the systems and methods for playbook automation are described in the general context of computer-executable instructions (program modules) being executed by a computing device such as a personal computer. Program modules generally include routines, programs, objects, components, data structures, etc., that perform particular tasks or implement particular abstract data types. While the systems and methods are described in the foregoing context, acts and operations described hereinafter may also be implemented in hardware.

Figure 1:
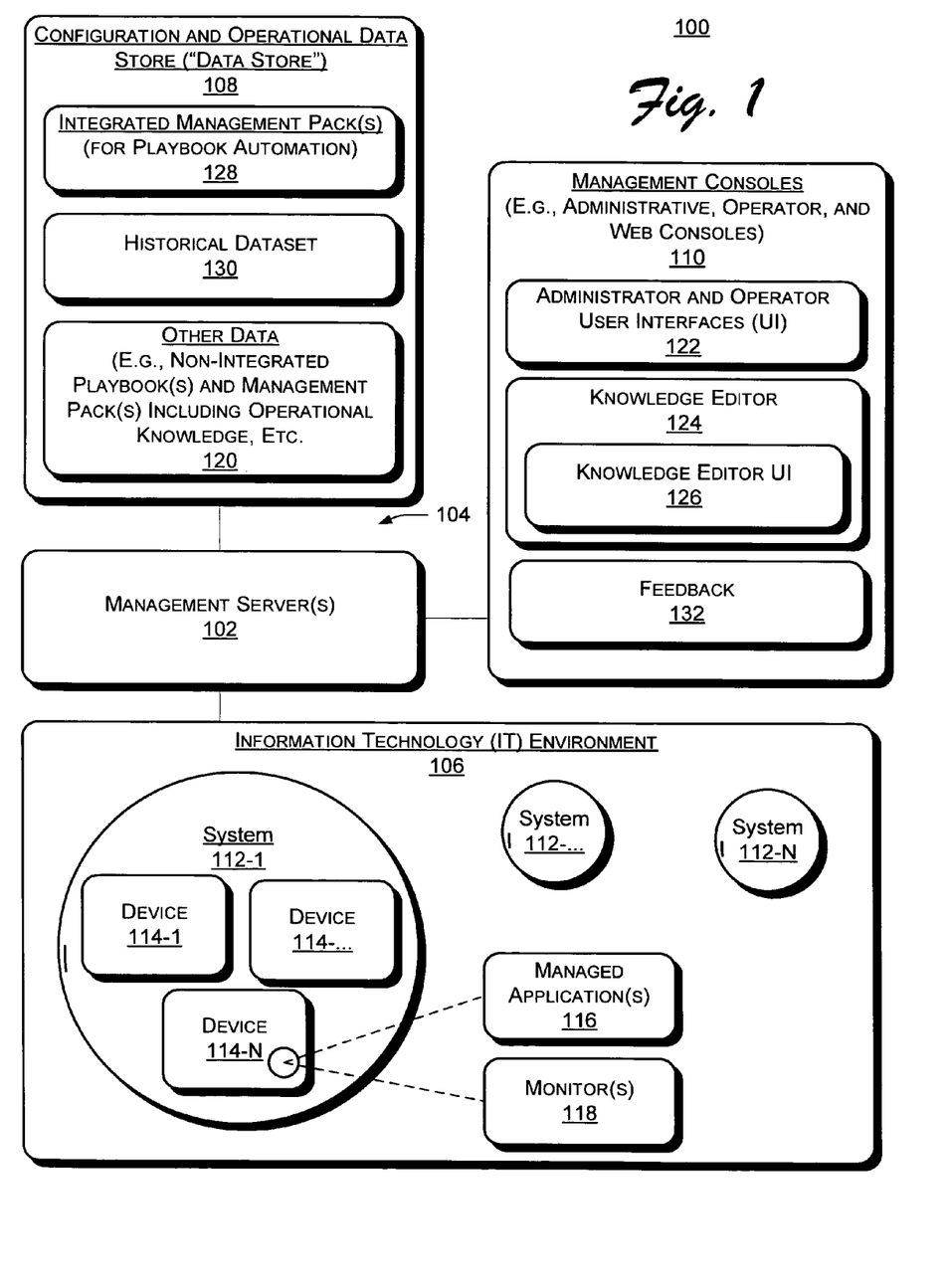
FIG. 1 illustrates an exemplary system provoiding playbook automation.

FIG. 1 shows an exemplary system 100 for playbook automation according to one embodiment. System 100 includes management server(s) 102 coupled across a network 104 to information technology (IT) environment 106, configuration and operations data store ("data store") 108, and management console(s) 110. IT environment 106 includes one or more systems 112 (i.e., 112-1 through 112-N). Each system 112 includes one or more devices 114 (i.e., 114-1 through 114-N) hosting one or more managed applications ("applications") 116. Management server 102 collects automated responses from one or more programmatic monitors 118 that monitor applications 116 for problems. (A programmatic service agent (not shown) runs a monitor 118 on a managed device 114).

Data store 108 is an authoritative source for configuration and operations information for management server(s) 102, console(s) 110, and monitor(s) 118. Data store 108 includes, for example, operations playbook(s) ("playbooks") and management pack(s). For purposes of exemplary illustration, playbooks and management packs are shown in data store 108 as part of "other data" 120. A playbook includes playbook-based tools and information resources to diagnose, resolve, and/or validate detected problems in respective ones of the managed applications 116. Playbook resources include, for example, one or more playbook-based tasks, reporting tools (e.g., views), and/or links to User Resource Identifiers (URIs). A management pack includes management pack-based tools and information resources to diagnose, resolve, and/or validate detected problems in respective ones of the managed applications 116. Management pack resources include, for example, operational knowledge, tasks, rules, rule overrides, scripts, and/or views. As described above, conventional systems do not integrate playbook and management pack resources.

In contrast to conventional systems, management console 110 allows an operation team member to integrate playbooks (i.e., playbook-based resources) into system 100 with contextually associated operational knowledge and other resources from a management pack (see "other data" 120). That is, management console 110 provides for integration of previously non-integrated resources from one or more playbooks and management packs into one or more integrated management packs 128. To accomplish this, an administrator utilizes administrative UI 122 to access data store 108, and therefrom, present a hierarchy of management packs and corresponding rules (i.e., monitors 118) for perusal and selection. The administrator can navigate through the hierarchy and rules to locate and select a rule of interest (e.g., "SQL Query Performance Warning", etc.) with associated operational knowledge. The rule of interest is a rule that the administrator wants to integrate with playbook-based operations management resources.

After selecting a rule, the administrator selects an edit operation from a list of actions associated with the rule's operational knowledge. Selection of the edit operation causes operations management console 110 to instantiate knowledge editor 124. Knowledge editor 124 allows the administrator to associate the rule and operational knowledge with one or more playbook-based resources. Knowledge editor 124 also allows the administrator to specify that certain one of the integrated playbook resource tasks are to be automatically executed by the rule (i.e., monitor 118) responsive to detection of an associated problem with a monitored application 116. For purposes of exemplary illustration, the newly integrated resources are shown as an integrated management pack 128. Operations team members interface with one or more of administrative and/or operations UIs 122 to receive and analyze automated responses from monitor(s) 118 that have been configured based on integrated management pack 128. In view of the automated responses, the operations team members can review operational knowledge and selectively interface with the resources (e.g., tasks, views, and links) provided by the integrated management pack 128 to diagnose, resolve, and/or verify a detected problem with a monitored application 116.

Exemplary Knowledge Editor User Interface

Figure 2:
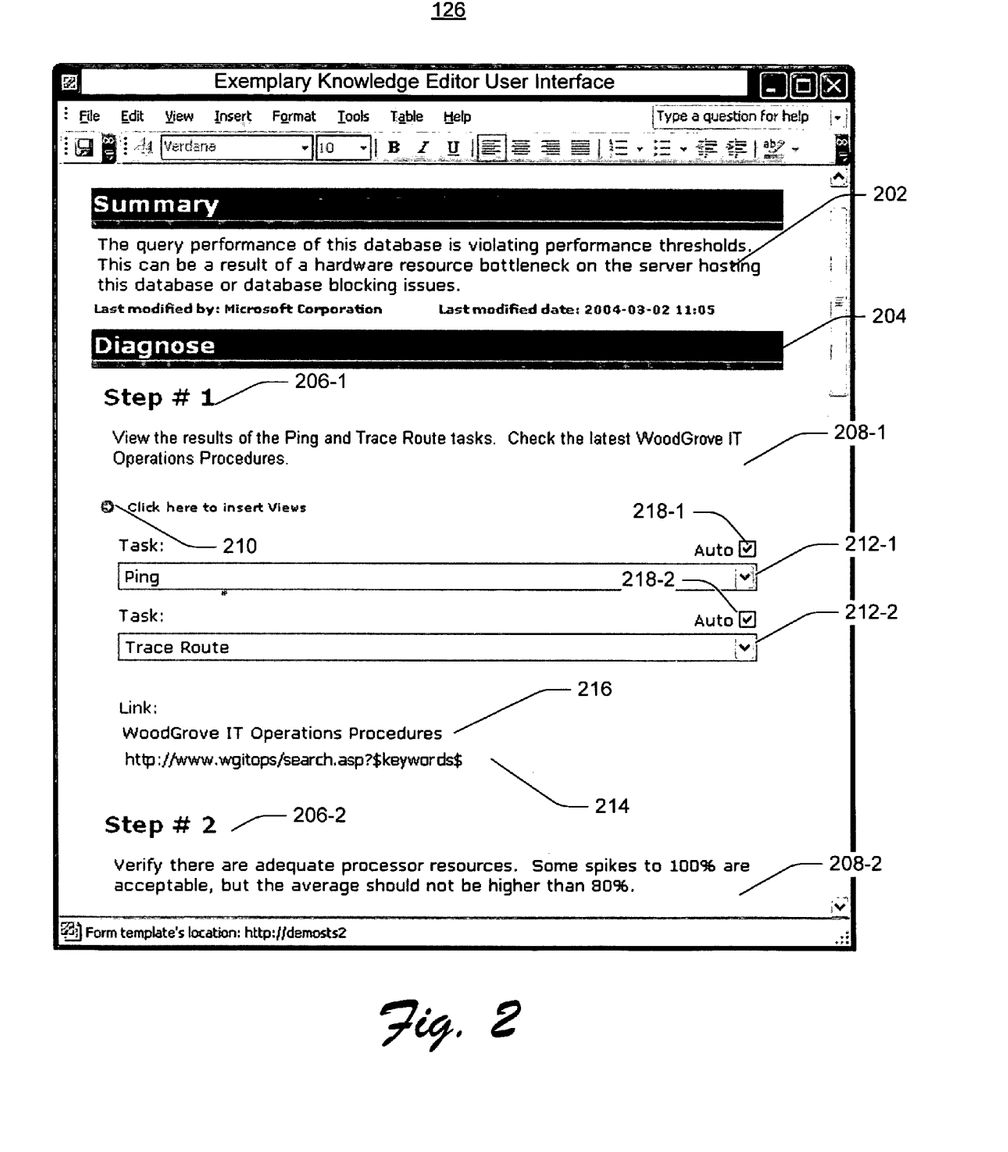
FIG. 2 shows an exemplary knowledge editor user interface (UI).

FIG. 2 shows an exemplary embodiment of a knowledge editor UI 126. For purposes of discussion and illustration, aspects of UI 126 are described with respect to components of FIG. 1. The left-most digit of a component reference number identifies the particular figure in which the component first appears. In this exemplary illustration, UI 126 includes summary section 202 and diagnose section 204. Summary section 202 presents operational knowledge 202. Operational knowledge 202 is associated with the rule selected by the administrator, as described in the preceding section. The "Diagnose" section 204 is divided into one or more "diagnostic steps" 206. For example, diagnose section 204 includes diagnostic step 206-1 ("Step # 1"), diagnostic step 206-2 ("Step # 2"), and as described below with respect to FIG. 3, diagnostic step 206-3 ("Step # 3").

UI 126 provides one or more UI controls for an administrator to selectively associate particular playbook task(s), view(s), and/or link(s) with operational knowledge 202. For example, step 210 of diagnose section 204 includes a UI control 210 for an administrator to specify one or more views or reporting tools. For purposes of discussion, a specified view is referred to as a view 114 (e.g., views 114-1 and 114-2 of FIG. 3).

Drop down menus 212-1 and 212-2 allow an administrator to identify specific playbook tasks for use within context of operational knowledge 202. In this example, drop down menu 120-1 specifies a "Ping" task, and drop down menu 120-2 specifies a "Trace Route" task. For purposes of discussion, the playbook tasks shown in drop down menus 120-1 and 120-2 are respectively referred to as tasks 120-1 and 120-2. In addition, although tasks 212-1 and 212-2 are playbook-based tasks, an administrator can also associated one or more management pack tasks (views, etc.) with operational knowledge 202.

Identified tasks 212 can be manually executed by an operations team member, or automatically executed by the corresponding monitor 118 (i.e., rule) responsive to detecting a problem with an application 116. UI 126 provides a respective checkbox 218 next to a task drop down menu 120 for the administrator to tag a particular task 212 for automatic execution. When a task is manually or automatically executed, information associated with the detected problem (e.g., identity of application 116, location, etc.) is determined by the corresponding monitor 118. This information is passed to respective ones of the automatically executed tasks 212. Thus, a monitor 118 (or other entity) passes contextually relevant information (i.e., relevant to task operations for diagnosing, resolving, and/or verifying the problem) to the tasks before the tasks are executed. This makes the selected playbook-based tasks 212 context aware (with respect to the detected problem).

UI 126 also includes one or more UI controls 214 and 216 for an administrator to respectively specify one or more links (URIs) and provide link description.

In this implementation, each diagnostic step 206-1 and 206-2 includes an edit control for an administrator to specify instructions/directions 208 to assist understanding in how to implement or otherwise interface with any selectively incorporated tasks 212, links 214, and/or views 210 indicated within the particular diagnostic step 206. For instance, instructions 208-1 instruct that results of tasks 212-1 and 212-2 should be reviewed, and operational procedures found at a link 214 should be investigated. Instructions 208 include instructions 208-1, 208-2, and instructions 208-3, as described below with respect to FIG. 3.

Responsive to the administrator saving the configuration specified in UI 126, knowledge editor 124 creates a new version of the "knowledge" in data store 108. This new version is integrated management pack 128. The integrated management pack 128 tightly integrates playbook information and resources with management pack resources such as operational knowledge within context of the operations management infrastructure of system 100. In one implementation, information and resources associated with integrated management pack 128 are stored in a markup language such as Extensible Markup Language (XML).

In one implementation, system 100 automatically updates (e.g., pulls) at least a subset of the information used to create an integrated management 128 into data store 108 from a central knowledge repository of operations management information and best practices (e.g., from Microsoft TechNet, etc.).

Figure 3:
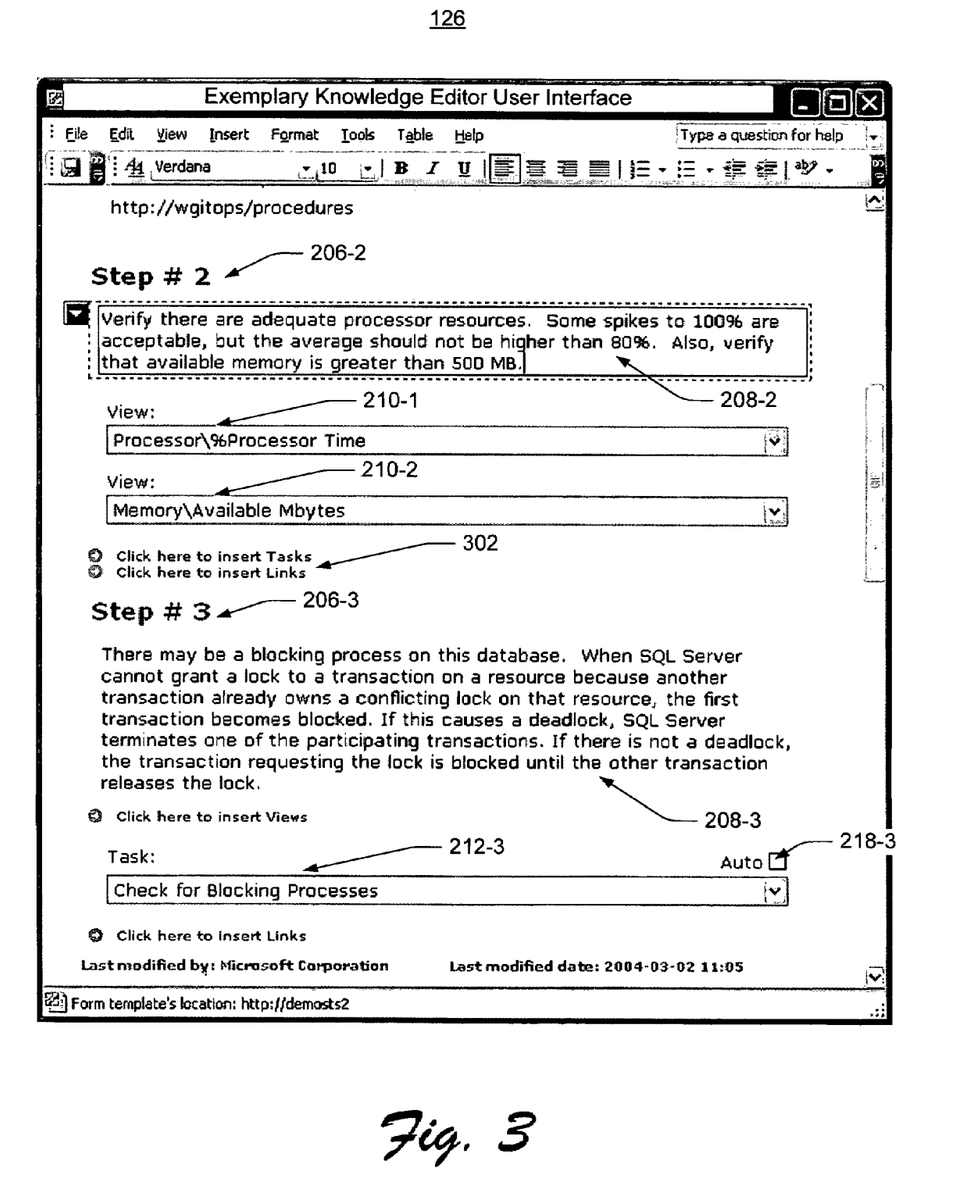
FIG. 3 shows further aspects of the exemplary knowledge editor UI of FIG. 2.

FIG. 3 shows further exemplary aspects of knowledge editor UI 126 of FIG. 2, according to one embodiment. For purposes of discussion, FIG. 3 is described with respect to components of FIGS. 1 and 2. The left-most digit of a component reference number identifies the particular figure in which the component first appears. As shown, UI 126 also indicates that two different types of views 210 (e.g., 210-1 and 210-2) have also been associated with operational knowledge 202. Additionally, a third diagnostic step 206-3 is provided along with associated diagnostic information 208-3 and playbook-based task 212-3. UI control 218-3 has not been selected, indicating that task 212-3 is not to be automatically executed by a monitor 118.

An Exemplary Operator Console User Interface

Figure 4:
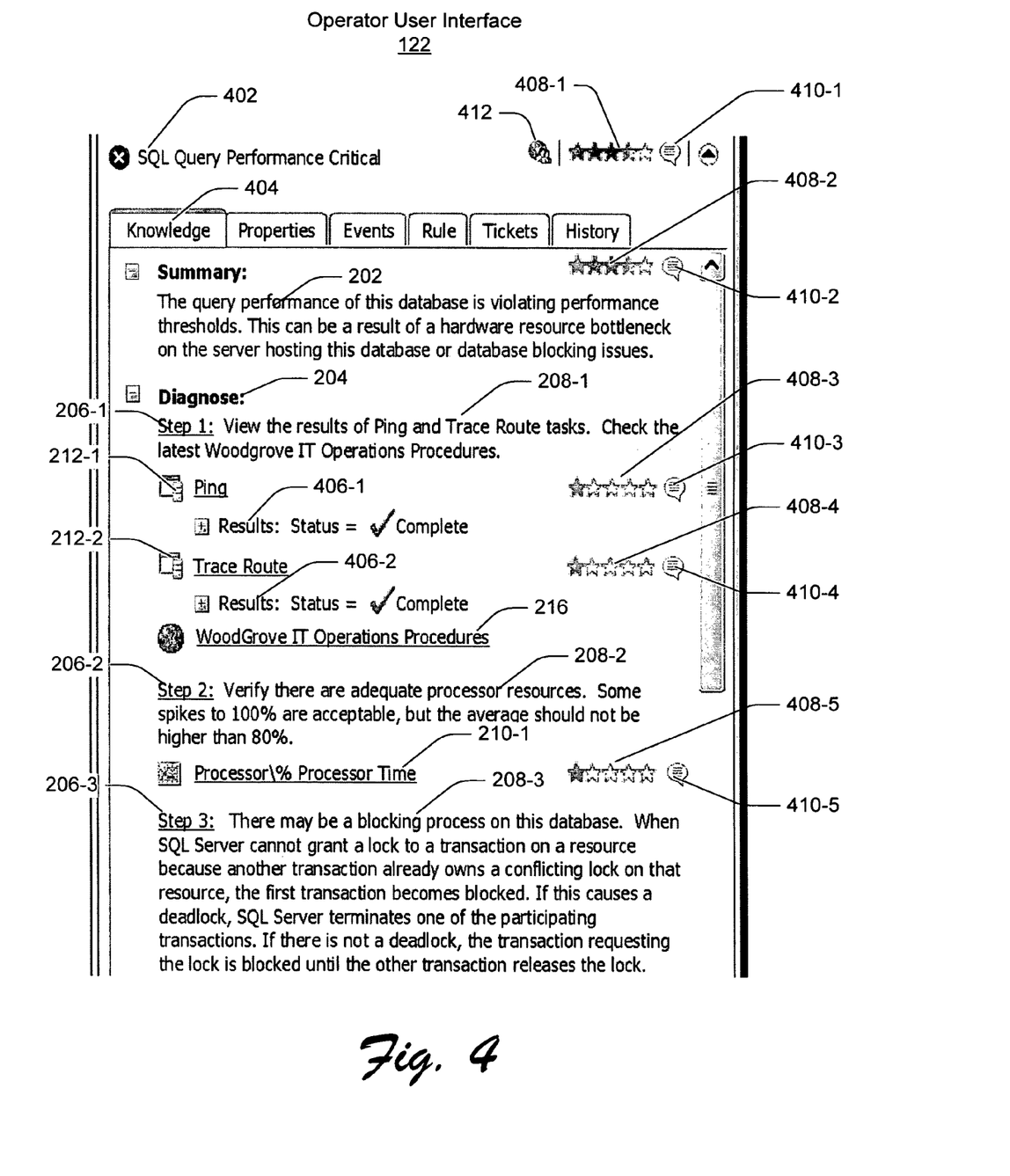
FIG. 4 shows an exemplary operator console UI for presentation of knowledge to an operator managing at least a subset of an IT environment.

FIG. 4 shows an exemplary embodiment of an operator UI 122 presented by an operator management console 110. For purposes of discussion, FIG. 4 is described with respect to components of FIGS. 1 through 3, wherein the left-most digit of a component reference number identifies the particular figure in which the component first appears. Operator UI 122 presents information associated with a particular rule 402 (i.e., a monitor 118) to an operations team member managing at least a subset of applications 116 in IT environment 106.

UI 122 includes "Knowledge" section 404. In this example, the information presented in Knowledge section 404 corresponds to the information described above with respect to the knowledge editor of FIGS. 2 and 3. For example, operator UI 122 presents operational knowledge 202 and a "Diagnose" section 204, including one or more diagnostic step(s) 206 (e.g., steps 206-1 through 206-3). Each step 206 includes descriptive information 208, and one or more selected task(s) 212, link(s) 214 (e.g., represented by descriptive text 216), and/or view(s) 210 to assist problem diagnosis, resolution, and/or validation for an application 116. A task 212 targeted for automatic execution is identified in associating with corresponding results 406 (e.g., 406-1 and 406-2) of the task for management entity review.

In one implementation, operator UI 122 shows current and/or historical execution status and/or results 406 for the task 212. Task status includes, for example, an indication of the task progress. Task results include, for example, any one or more of the following:

Actual execution results of the task 212 for the current task execution;
Results of all executions of this task 212 against this particular managed device 114 and/or application 116;
Results of all executions of task 212 with respect to any managed device 114 and/or application 116; and
Results of all executions of this task 212 automatically or manually run within the context of the corresponding monitor 118 for the managed entity 114 in question, for all managed entities 114, and/or applications 116.

Figure 5:
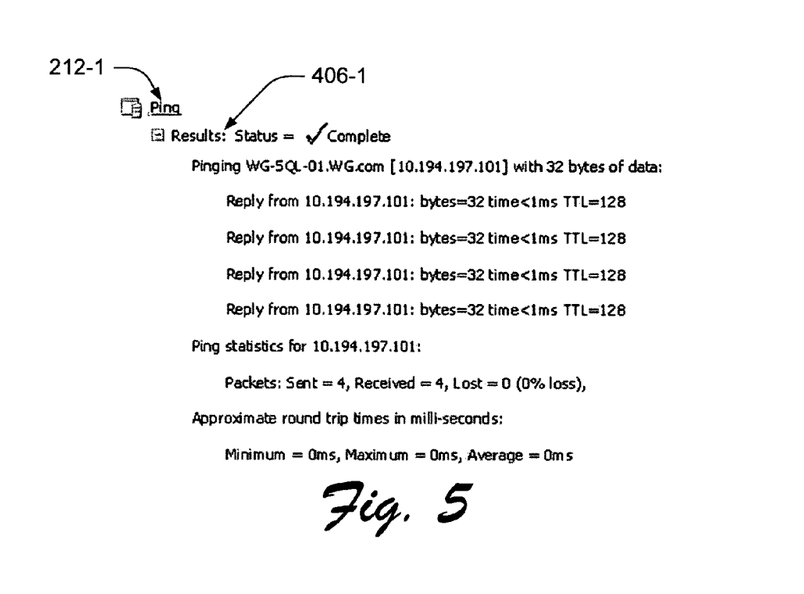
FIG. 5 shows exemplary task result presentation in context with an integrated management pack-based task and operational knowledge associated with application problem resolution processes.

FIG. 5 shows an exemplary implementation of task results 406 for presentation in context with a task 212 and operational knowledge 202 associated with system 100 problem resolution processes. The left-most digit of a component reference number in FIG. 5 identifies the particular figure in which the component first appears.

Historical Feedback and Freeform Text Operator Feedback

Referring to FIG. 4, operator UI 122 presents historical feedback 408 on many aspects of the underlying resources associated with UI 122. For purposes of exemplary illustration, historical dataset 130 in FIG. 1 represents such historical feedback. Although the particular technique(s) used to present historical feedback 408 (e.g., 408-1 through 408-5) to an operator is arbitrary, this implementation uses a star rating system to provide historical feedback. A greater number of filled-in stars indicate more usefulness/helpfulness of the rated aspect. Historical feedback 408-1 applies to the associated monitor 118, "as a whole." The "as a whole" concept applies to all aspects of the integrated management pack 128 associated with the monitor 118. Historical feedback 408 is also presented for individual aspects of integrated management pack 128. For example, historical feedback 408-2 through 408-5 applies to operational knowledge 202, task(s) 212, link(s) 214, and/or view(s) 210.

UI 122 allows an operations team member to provide freeform text feedback for subsequent review by others. For purposes of exemplary illustration, freeform text feedback is shown as feedback 132 of FIG. 1. In this implementation, for example, an operator can provide freeform text feedback with respect to the monitor 118 as a whole (in its entirety), operational knowledge 202, task(s) 212, link(s) 214, and/or view(s) 210 by selecting respective ones of bubble icons 410 (e.g., 410-1 through 410-5). Responsive to being selected, a bubble icon 410 will present a text input control or window. For example, if an operator wants to provide freeform text feedback on operational knowledge 202, the operator selects bubble icon 410-2 and inputs the feedback text into the displayed window.

Figure 6:
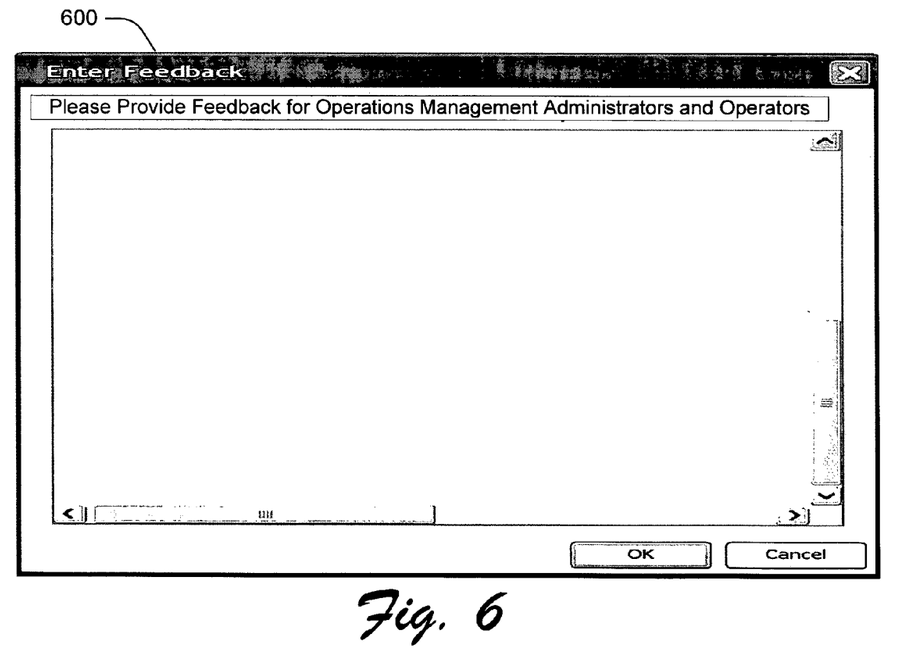
FIG. 6 shows an exemplary freeform text feedback input window.

FIG. 6 shows one embodiment of a freeform text feedback input window 600.

Management server 102 stores freeform text feedback 132, along with task use statistics, task success rates, and/or the like, onto configuration and operations data store 108 as part of historical dataset 130. In one implementation, freeform text feedback corresponding to the rule 402, and/or other aspects of the rule's associated knowledge, is available to the operator by selecting icon 412. In one implementation, the freeform text feedback also includes feedback from customers that use system 100 (e.g., via an anonymous feedback channel, or via an online community web site) as well as from operations team members. This feedback can be used by developers to improve the quality of the integrated management pack 128.

An Exemplary Administrator Console User Interface

Figure 7:
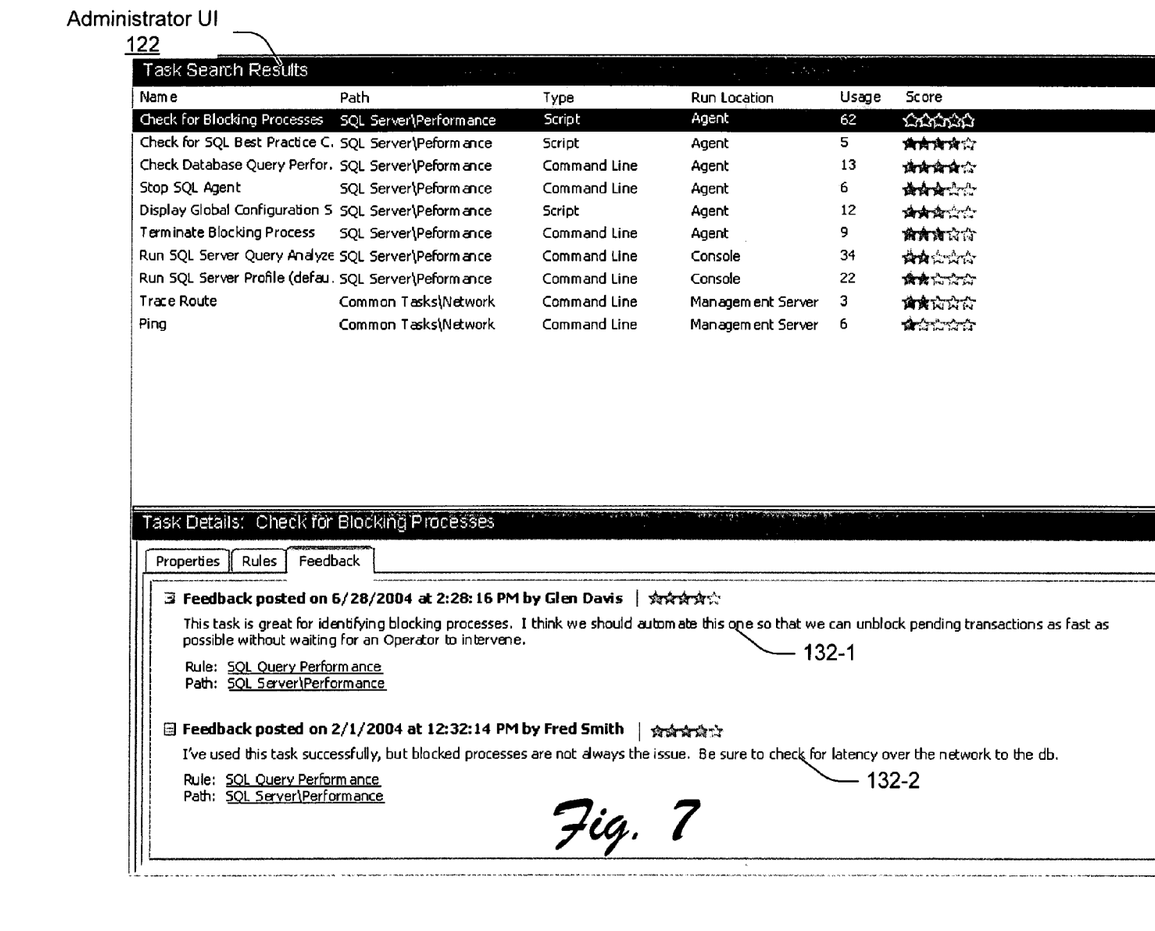
FIG. 7 shows an exemplary administrator console user interface for presenting aspects of a historical data set to an operations administrator.

FIG. 7 shows an administrator console UI 122 according to one embodiment for presenting aspects of the historical data set to an administrator. FIG. 7 is described with respect to components of FIGS. 1 through 4. The left-most digit of a component reference number identifies the particular figure in which the component first appears.

Administrator UI 122 presents historical data set 130 (FIG. 1). As shown, UI 122 presents task name, location (e.g., directory path), type, run location, use statistics, and operator/administrator feedback scores based on freeform text feedback 132. UI 122 also presents selected task 212 details, for example, associated with the "Feedback" tab. Such details include, for example, any corresponding freeform text feedback 132 (e.g., 132-1 and 132-2), the rule (i.e., monitor) and location associated with the selected task. In view of this, or other presented historical data, an administrator can determine whether certain monitors 118, task(s) 212, operational knowledge 202, link(s) 214, view(s) 210, etc, are useful for application 116 problem diagnoses, resolution, and/or validation. Thus, the information provides indications of whether the knowledge or tools can be improved, automated, etc.

Figure 8:
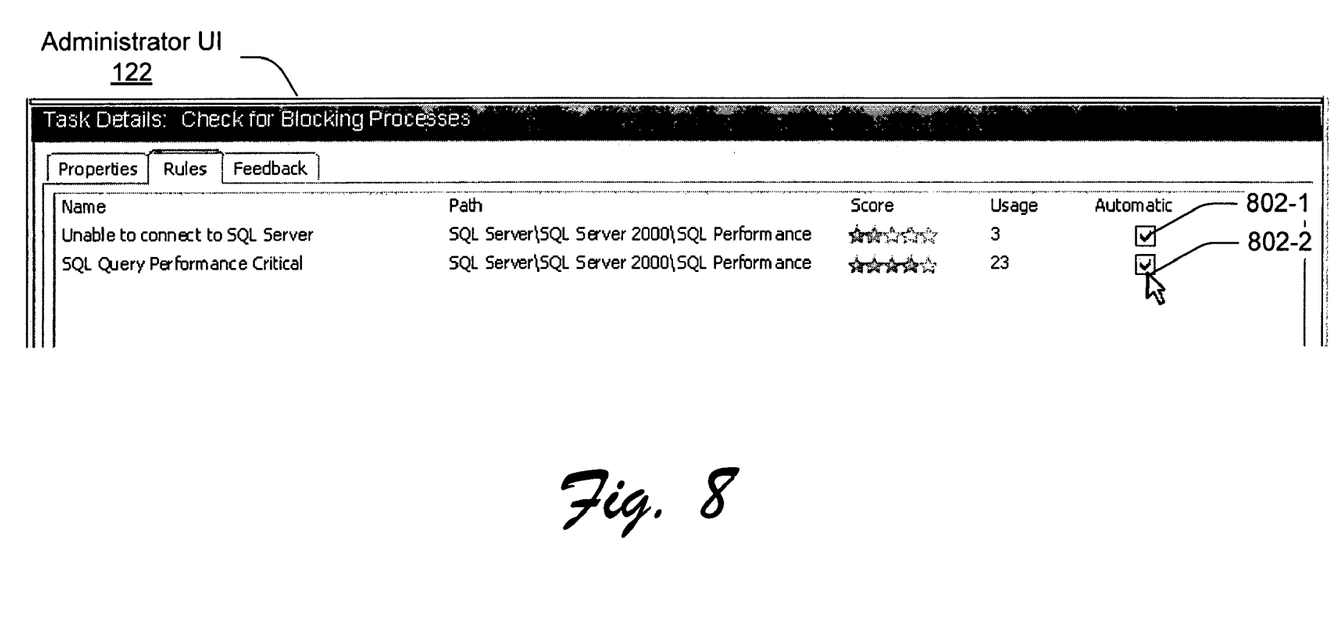
FIG. 8 shows further aspects of the exemplary administrator console UI of FIG. 7.

FIG. 8 shows further aspects of the administrator console UI 122 of FIG. 7, according to one embodiment. FIG. 8 is described with respect to components of FIGS. 1 through 4, and 7. The left-most digit of a component reference number identifies the particular figure in which the component first appears.

Referring to FIG. 8, a "Rules" tab allows an administrator to view rule (monitor 118) names associated with a selected task 212, a location (e.g., path) of the selected task, feedback score, use statistics. Additionally, administrator UI 122 allows the administrator to indicate, for example, via control (s) 802 (e.g., 802-1 and 802-2), whether a particular task is automatically executed responsive to a monitor 118 being triggered.

Exemplary Procedures

An Exemplary Procedure for a Knowledge Editor

Figure 9:
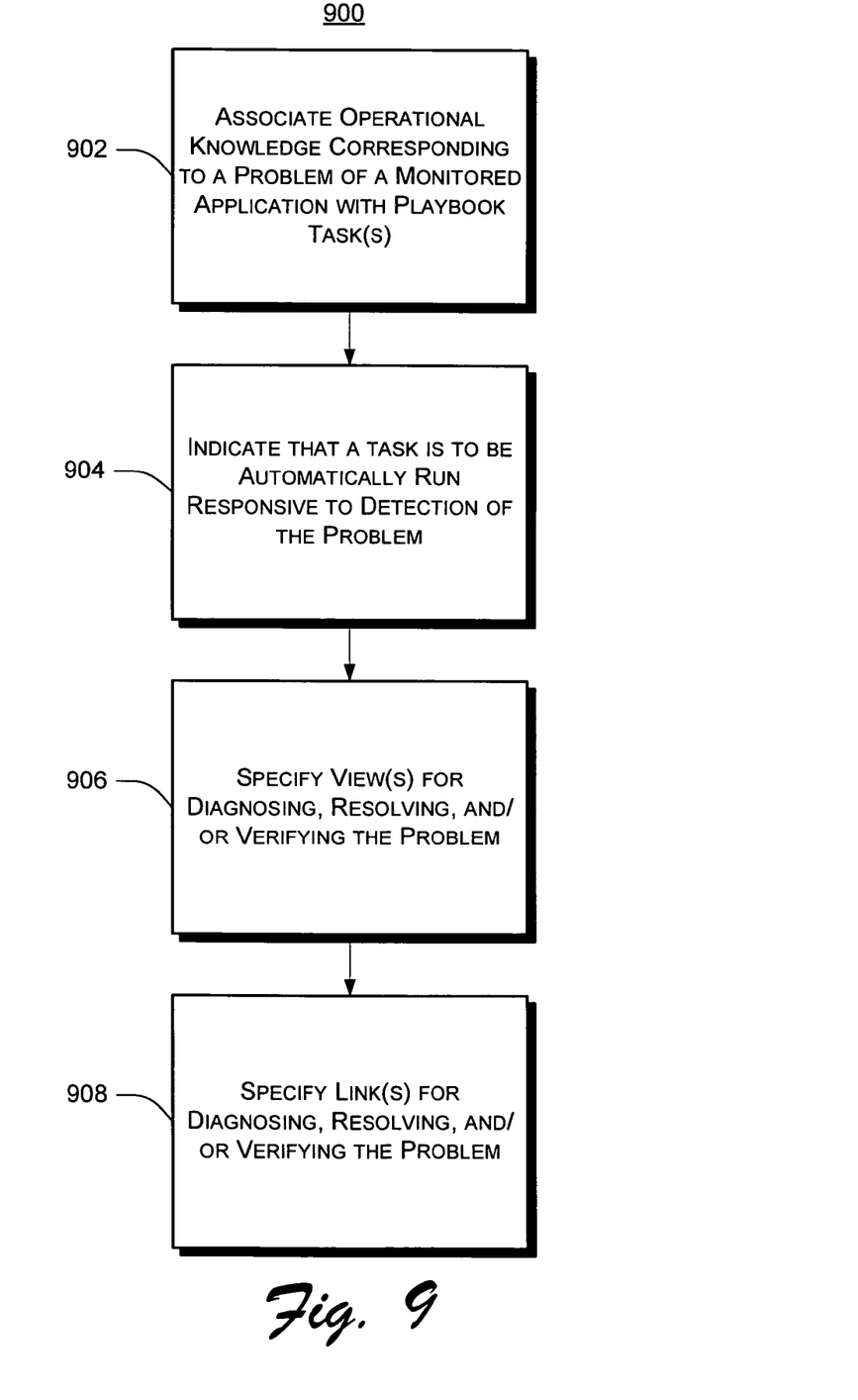
FIG. 9 shows an exemplary procedure for creating an integrated management pack from playbook tasks (e.g., performance monitors), reporting tools (e.g., views), and links for playbook automation.

FIG. 9 shows an exemplary embodiment of a procedure for creating an integrated management pack 128 (or new management pack) from playbook tasks (e.g., performance monitors), reporting tools (e.g., views), and links for playbook automation. For purposes of discussion and illustration, operations of this procedure are described with respect to components of FIGS. 1 and 2. The left-most digit of a component reference number identifies the particular figure in which the component first appears.

At block 902, knowledge editor 124 (FIG. 1) associates operational knowledge 202 from a management pack with one or more playbook tasks 212. The one or more tasks 212 are for diagnosing, resolving, and/or verifying a problem associated with a monitored application 116. At block 904, the knowledge editor 124 specifies that responsive to detection of the problem with an application 116, at least one of the one or more tasks 212 will be automatically run by a monitor 118 executing on a managed device 114. At block 906, the knowledge editor 124 specifies one or more views 214 (e.g., reporting tools) for diagnosing, resolving, or verifying the problem. The view(s) are contextually associated to the operational knowledge. At block 908, the knowledge editor 124 specifies one or more links 210 for diagnosing, resolving, or verifying the problem. The link(s) are contextually associated to the operational knowledge.

An Exemplary Procedure for an Operations Management Console

Figure 10:
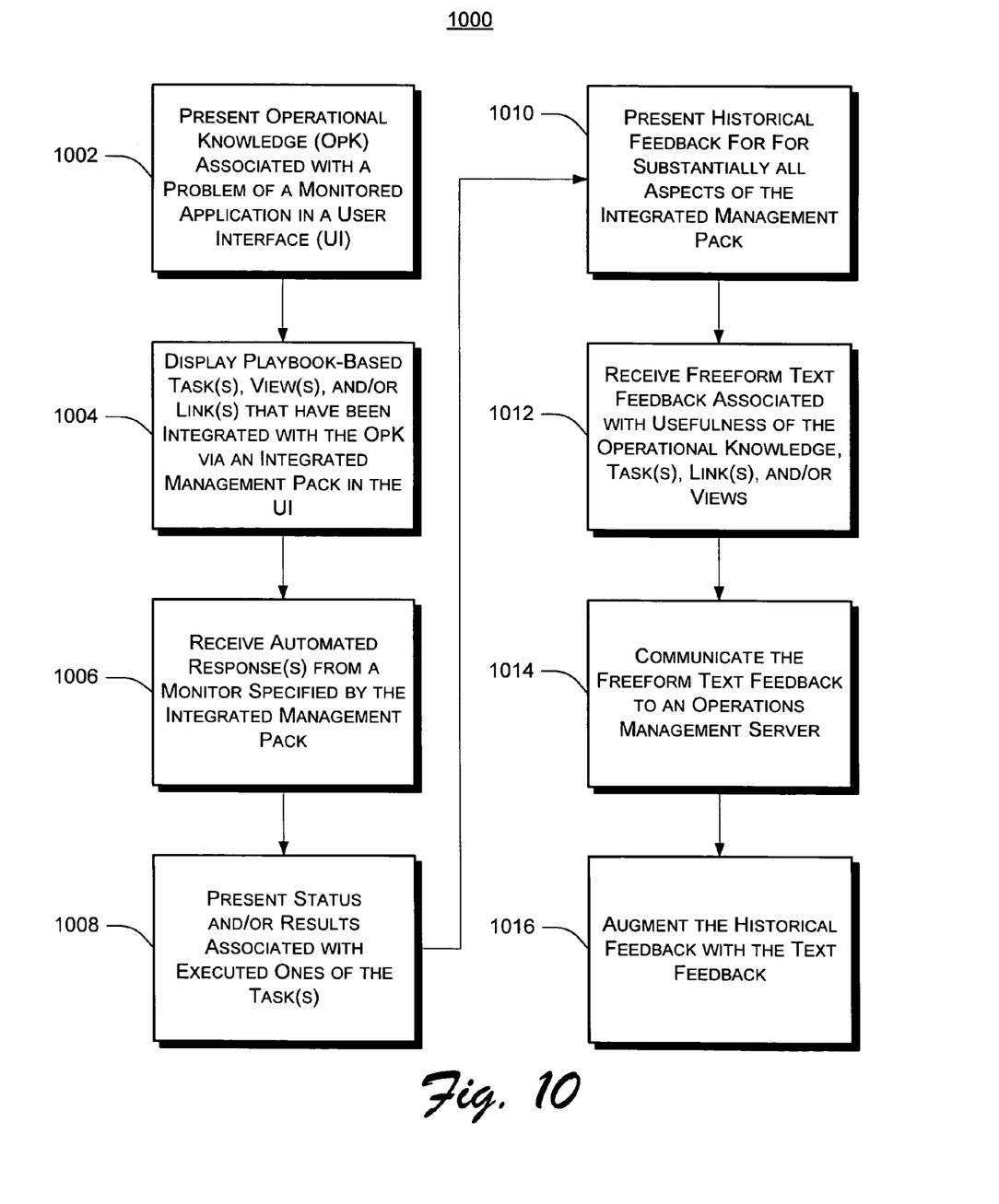
FIG. 10 shows an exemplary procedure for an operator or administrator operations management console for playbook automation.

FIG. 10 shows an exemplary procedure for an operator or administrator operations management console 110 for playbook automation. For purposes of discussion and illustration, operations of this procedure are described with respect to components of FIGS. 1 and 2. The left-most digit of a component reference number identifies the particular figure in which the component first appears. In one implementation, the operations management console 110 is an administrator console. In another implementation, the operations management console 110 is an operator console.

At block 1002, an operator console 110 (FIG. 1) presents operational knowledge 202 in a UI 122. The operational knowledge corresponds to a problem associated with a monitored application 116. At block 1004, the operator console 110 displays one or more playbook-based tasks 212, views 214, and/or links 210 in the user interface 116. An integrated management pack 128 integrates the operational knowledge with one or more playbook-based links 210, tasks 212, and/or views 214. In one implementation, respective ones of the tasks 212, views 214, and/or links 210 are displayed in the UI with respect to one or more diagnostic steps 206. At block 1006, operations management console 110 receives automated responses from a monitor 118 specified by the integrated management pack 128. At block 1008, operations management console 110 presents status and/or results 406 associated with executed ones of the one or more tasks 212.

At block 1010, operations management console 110 presents historical feedback 130 in the UI 122. The historical feedback 130 indicates usefulness of the associated rule 402, operational knowledge 202, and any tasks 212, views 214, and/or links 210 for diagnosing, resolving, or verifying the problem. In one implementation, the historical feedback 130 includes task use statistics and/or task success rates. At block 1012, operations management console 110 receives freeform text feedback 132 regarding usefulness of the UI 122 and/or respective ones of any tasks 212, views 214, and/or links 210 for diagnosing, resolving, or verifying the problem. At block 1014, operations management console 110 communicates the freeform text feedback 132 to management server 102. At block 1016, operations management console 110 augments historical feedback 130 with the freeform text feedback 132 to provide an operator or an administer with a historical perspective of the usefulness of the knowledge and usefulness of respective ones of the one or more tasks 212, views 214, and/or links 210 for diagnosing, resolving, or verifying the problem. For purposes of exemplary illustration, management server 102 stores the historical feedback onto data store 108.

Exemplary Procedure for an Administrator Management Console

Figure 11:
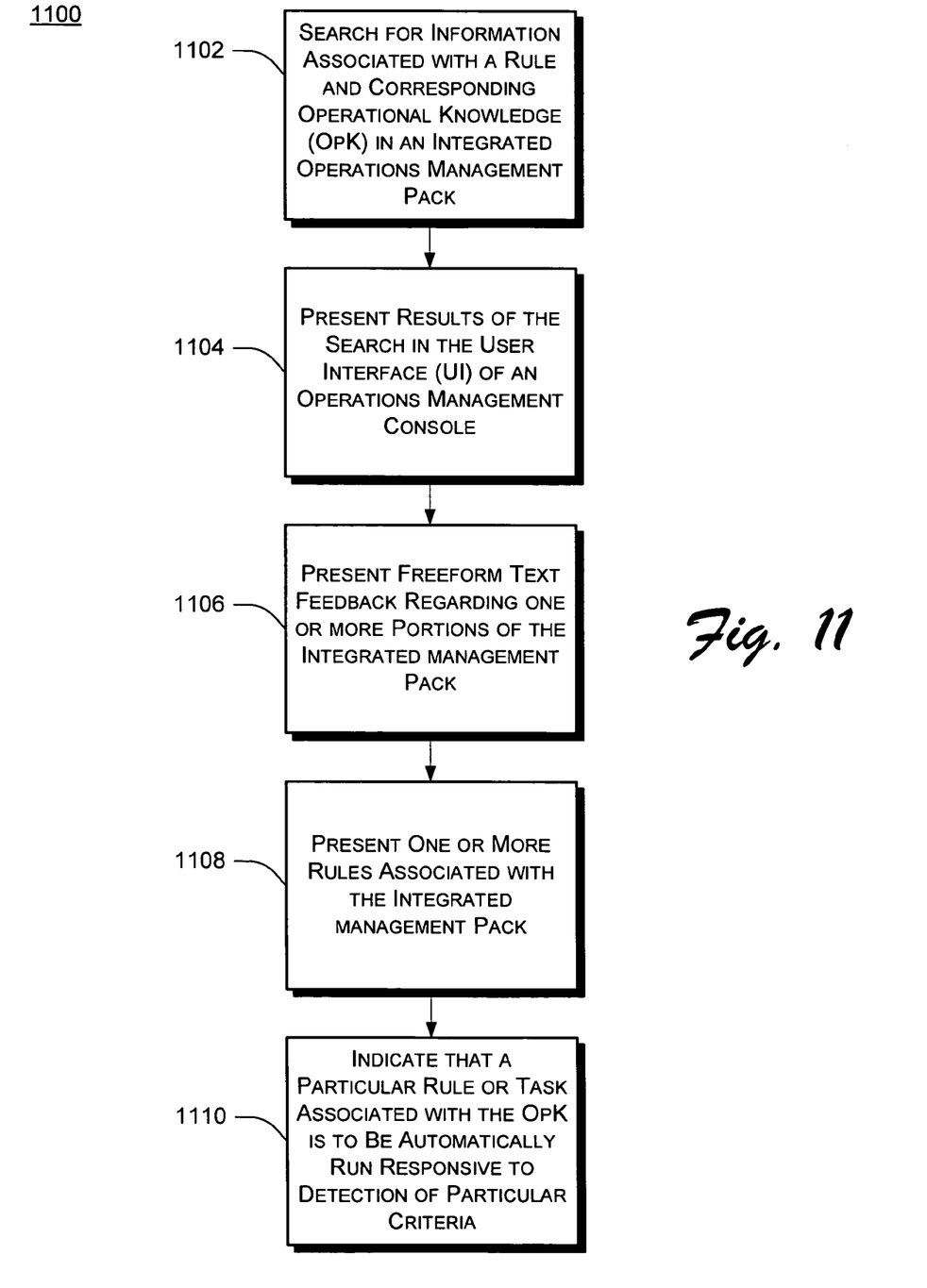
FIG. 11 shows an exemplary procedure for use of n operations management console for playbook automation.

FIG. 11 shows an exemplary procedure according to one embodiment for an administrator operations management console 110 for playbook automation. For purposes of discussion and illustration, operations of this procedure are described with respect to components of FIGS. 1 and 2. The left-most digit of a component reference number identifies the particular figure in which the component first appears.

At block 1102, a search for information associated with managing an application 116 is performed. In one implementation, for example, the search specifies one or more tasks 212, views 214, or links 210 associated with operational knowledge 202 or a monitor 118 associated with an integrated management pack 128. For example, a user clicks a search button displayed on a toolbar. Responsive to this selection, a search dialog is displayed. The user utilizes the search dialog to specify the search criteria (e.g., alerts, events, monitors, rules, tasks, etc). In this example, the user chooses to search for monitors 118, and additional associated criteria.

At block 1104, administrator operations management console 110 presents results of the search in an administrator user interface 122. In one implementation, the results include historical feedback (from historical data set 130) associated with the search criteria. The historical feedback 130 indicates usefulness of one or more respective aspects of the integrated management pack 128 identified with the search criteria. For example, historical feedback 130 for respective ones of the tasks 212, views 214, or links 210 is shown in the results to indicate usefulness of the respective resources for diagnosing, resolving, or verifying a problem with a monitored application 116. In one implementation, the historical feedback 130 also includes task, view, or link use statistics.

At block 1106, administrator operations management console 110 presents freeform text feedback 130 in the user interface 116. The freeform text feedback 130 corresponds to input comments directed to respective aspects of resource(s) provided to analyze, resolve, verify, and/or so on, a problem with an application 116. In one implementation, the comments are directed to usefulness or other arbitrary aspects of one or more of tasks 212, views 214, or links 210. The freeform text feedback 130 is extracted from historical data set 130.

At block 1128, administrator operations management console 110 presents one or more rules associated with the returned results. For instance, administrator operations management console 110 presents one or more rules in a user interface 116. The rules are associated with a selected one or more of tasks 212, views 214, or links 210. At block 1010, administrator operations management console 110 provides for automation of at least one of the one or more rules, or tasks.

An Exemplary Operating Environment

Figure 12:
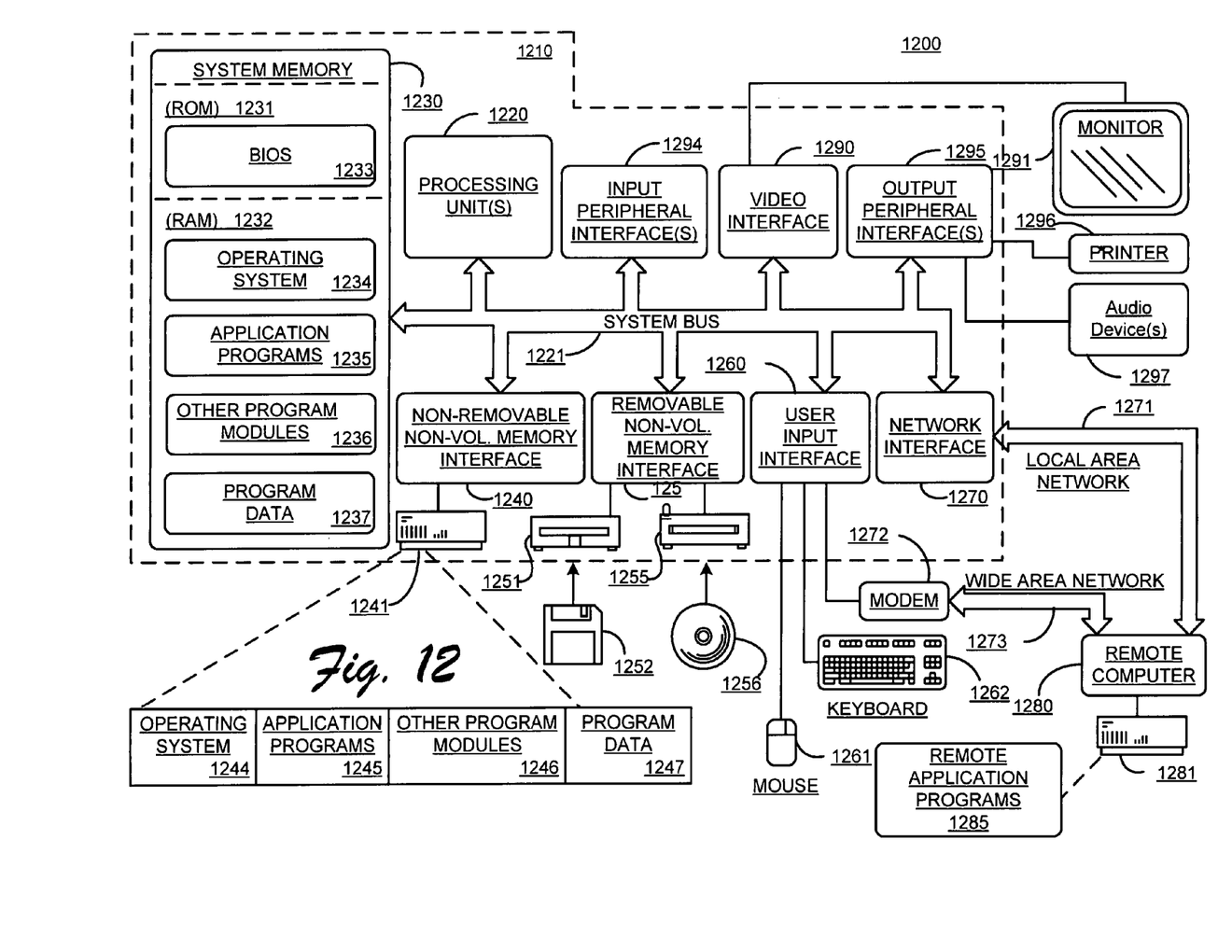
FIG. 12 illustrates an example of a suitable computing environment in which playbook automation may be fully or partially implemented.

FIG. 12, according to one embodiment, illustrates an example of a suitable computing environment in which playbook automation may be fully or partially implemented. Exemplary computing environment 1200 is only one example of a suitable computing environment for the exemplary system 100 of FIG. 1 and exemplary operations of FIGS. 9 through 11, and is not intended to suggest any limitation as to the scope of use or functionality of systems and methods the described herein. Neither should computing environment 1200 be interpreted as having any dependency or requirement relating to any one or combination of components illustrated in computing environment 1200.

The methods and systems described herein are operational with numerous other general purpose or special purpose computing system, environments or configurations. Examples of well-known computing systems, environments, and/or configurations that may be suitable for use include, but are not limited to, cellular phones, pocket PC, personal computers, server computers, multiprocessor systems, microprocessor-based systems, network PCs, minicomputers, mainframe computers, distributed computing environments that include any of the above systems or devices, and so on. Compact or subset versions of the framework may also be implemented in clients of limited resources, such as handheld computers, or other computing devices. The invention, although not required, may be practiced in a distributed computing environment where tasks are performed by remote processing devices that are linked through a communications network. In a distributed computing environment, program modules may be located in both local and remote memory storage devices.

With reference to FIG. 12, an exemplary system providing playbook automation includes a general purpose computing device in the form of a computer 1210 implementing, for example, system 100 of FIG. 1. The following described aspects of computer 1210 are exemplary implementations of computing device(s) used to implement one or more of management server 102, management console(s) 110, device(s) 114, and/or an online community web site for selective presentation of free form feedback 132. Components of computer 1210 may include, but are not limited to, processing unit(s) 1220, a system memory 1230, and a system bus 1221 that couples various system components including the system memory to the processing unit 1220. The system bus 1221 may be any of several types of bus structures including a memory bus or memory controller, a peripheral bus, and a local bus using any of a variety of bus architectures. By way of example and not limitation, such architectures may include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

A computer 1210 typically includes a variety of computer-readable media. Computer-readable media can be any available media that can be accessed by computer 1210 and includes both volatile and nonvolatile media, removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 1210.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example and not limitation, communication media includes wired media such as a wired network or a direct-wired connection, and wireless media such as acoustic, RF, infrared and other wireless media. Combinations of the any of the above should also be included within the scope of computer-readable media.

System memory 1230 includes computer storage media in the form of volatile and/or nonvolatile memory such as read only memory (ROM) 1231 and random access memory (RAM) 1232. A basic input/output system 1233 (BIOS), containing the basic routines that help to transfer information between elements within computer 1210, such as during start-up, is typically stored in ROM 1231. RAM 1232 typically contains data and/or program modules that are immediately accessible to and/or presently being operated on by processing unit 1220. By way of example and not limitation, FIG. 12 illustrates operating system 1234, application programs 1235, other program modules 1236, and program data 1237.

The computer 1210 may also include other removable/non-removable, volatile/nonvolatile computer storage media. By way of example only, FIG. 12 illustrates a hard disk drive 1241 that reads from or writes to non-removable, nonvolatile magnetic media, a magnetic disk drive 1251 that reads from or writes to a removable, nonvolatile magnetic disk 1252, and an optical disk drive 1255 that reads from or writes to a removable, nonvolatile optical disk 1256 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 1241 is typically connected to the system bus 1221 through a non-removable memory interface such as interface 1240, and magnetic disk drive 1251 and optical disk drive 1255 are typically connected to the system bus 1221 by a removable memory interface, such as interface 1250.

The drives and their associated computer storage media discussed above and illustrated in FIG. 12, provide storage of computer-readable instructions, data structures, program modules and other data for the computer 1210. In FIG. 12, for example, hard disk drive 1241 is illustrated as storing operating system 1244, application programs 1245, other program modules 1246, and program data 1247. Note that these components can either be the same as or different from operating system 1234, application programs 1235, other program modules 1236, and program data 1237. Operating system 1244, application programs 1245, other program modules 1246, and program data 1247 are given different numbers here to illustrate that they are at least different copies.

A user may enter commands and information into the computer 1210 through input devices such as a keyboard 1262 and pointing device 1261, commonly referred to as a mouse, trackball or touch pad. Other input devices (not shown) may include a microphone, joystick, game pad, satellite dish, scanner, or the like. These and other input devices are often connected to the processing unit 1220 through a user input interface 1260 that is coupled to the system bus 1221, but may be connected by other interface and bus structures, such as a parallel port, game port or a universal serial bus (USB).

A monitor 1291 or other type of display device is also connected to the system bus 1221 via an interface, such as a video interface 1290. In addition to the monitor, computers may also include other peripheral output devices such as printer 1296 and audio device(s) 1297, which may be connected through an output peripheral interface 1295.

The computer 1210 operates in a networked environment using logical connections to one or more remote computers, such as a remote computer 1280. In one implementation, remote computer 1280 represents computing device 122 or networked computer 124 of FIG. 1. The remote computer 1280 may be a personal computer, a server, a router, a network PC, a peer device or other common network node, and as a function of its particular implementation, may include many or all of the elements described above relative to the computer 1210, although only a memory storage device 1281 has been illustrated in FIG. 12. The logical connections depicted in FIG. 12 include a local area network (LAN) 1281 and a wide area network (WAN) 1273, but may also include other networks. Such networking environments are commonplace in offices, enterprise-wide computer networks, intranets and the Internet.

When used in a LAN networking environment, the computer 1210 is connected to the LAN 1271 through a network interface or adapter 1270. When used in a WAN networking environment, the computer 1210 typically includes a modem 1272 or other means for establishing communications over the WAN 1273, such as the Internet. The modem 1272, which may be internal or external, may be connected to the system bus 1221 via the user input interface 1260, or other appropriate mechanism. In a networked environment, program modules depicted relative to the computer 1210, or portions thereof, may be stored in the remote memory storage device. By way of example and not limitation, FIG. 12 illustrates remote application programs 1285 as residing on memory device 1281. The network connections shown are exemplary and other means of establishing a communications link between the computers may be used.

CONCLUSION

Although the systems and methods for playbook automation have been described in language specific to structural features and/or methodological operations or actions, it is understood that the implementations defined in the appended claims are not necessarily limited to the specific features or actions described. Rather, the specific features and operations of system 100 are disclosed as exemplary forms of implementing the claimed subject matter.

The invention claimed is:

1. A computer-implemented method comprising:
    selecting at least one rule included in an operational knowledge associated with an application being monitored;
    associating, one or more playbook-based tasks, playbook-based views, or playbook-based links with the at least one rule, the playbook-based tasks, playbook-based views, and playbook-based links being for one or more of diagnosing, resolving, and verifying a problem associated with the application; and
    generating an integrated management pack responsive to the selecting and the associating, the integrated management pack enabling sharing of information between the operational knowledge and the one or more playbook-based tasks, the playbook-based views, or the playbook-based links.

2. The method of claim 1, further comprising specifying that at least one of the playbook-based tasks is to be automatically executed by the at least one rule responsive to detection of the problem.

3. The method of claim 1, wherein at least one task of the playbook-based tasks is a context aware task that executes in view of automatically provided context associated with the problem.

4. A method as recited in claim 1, wherein the selecting and associating specify information and resources for presentation in an operator or administrator management console user interface.

5. A method as recited in claim 1, wherein information and resources associated with the integrated management pack are represented in a markup language.

6. A method as recited in claim 1, wherein the method further comprises automatically updating at least a subset of the information used to create the integrated management pack from a central knowledge repository.

7. A computer-implemented method comprising:
presenting, by an operations management console in a user interface (UI), at least one rule included in an operational knowledge from a management pack, the operational knowledge corresponding to a problem associated with a monitored application; and
displaying one or more play-book based tasks, views, or links in the user interface, the one or more tasks, views, or links for being contextually associated with the at least one rule to diagnose, resolve, or verify the problem.

8. A method as recited in claim 7, wherein the operations management console is an operator console or an administrator console.

9. A method as recited in claim 7, wherein the operational knowledge, playbook-based tasks, views, or links are displayed with respect to one or more diagnostic steps for one or more of diagnosing, resolving, and verifying the problem.

10. A method as recited in claim 7, wherein a particular task of the one or more playbook-based tasks is designated for automatic execution, and wherein the method further comprises receiving an automated response from an entity monitoring the monitored application, the automated response having been generated by the particular task in context of information received responsive to detecting the problem.

11. A method as recited in claim 7, wherein the method further comprises displaying results of at least one of the playbook-based tasks in the UI for review.

12. A method as recited in claim 7, wherein the method further comprises: presenting, in the UI, historical feedback; and wherein the historical feedback is directed to one or more of a monitor associated with the operational knowledge, the operational knowledge, a task of the playbook-based tasks, a view of the views, and a link of the links.

13. A method as recited in claim 12, wherein the historical feedback further comprises task use statistics or task success rates.

14. A method as recited in claim 7, wherein the method further comprises: presenting, by the UI, one or more controls for an operator or administrator to input feedback associated with one or more of a monitor associated with the operational knowledge, the operational knowledge, a task of the playbook-based tasks, a view of the views, and a link of the links; and communicating the feedback to a data store for subsequent use.

15. A method as recited in claim 14, wherein the feedback is freeform text.

16. A method as recited in claim 14, wherein the method further comprises updating the feedback with information pulled from an online community web site, the information regarding usefulness of one or more portions of the integrated management pack, the integrated management pack comprising the monitor, the operational knowledge, the task, the view, and the link.

17. A method as recited in claim 14, wherein the method further comprises: augmenting a historical data set with the feedback to provide a historical perspective; presenting at least a subset of the historical data to a user, the subset providing an indication of usefulness of one or more of the monitor, the operational knowledge, the task, the view, and the link.

18. A computer-implemented method comprising:
searching for one or more tasks, views, or links associated with at least one rule included in an operational knowledge, at least one of the tasks, views, or links originally being from an operations playbook that was not integrated with a management pack, the operational knowledge corresponding to a problem of a monitored application; and
presenting, by an administrative console, results of the searching, the results comprising historical feedback for the at least one rule associated with the operational knowledge, the operational knowledge, one or more of the tasks being searched, one or more of the views being searched, and one or more of the links being searched, the historical feedback relating to prior use of the operational knowledge, one or more of the tasks being searched, one or more of the views being searched, and one or more of the links being searched.

19. A method as recited in claim 18, wherein the method further comprises presenting, by the administrative console, freeform text feedback in a user interface, the freeform text feedback corresponding comments directed to one or more of a rule associated with the operational knowledge, the operational knowledge, one or more of the tasks being searched, one or more of the views being searched, and one or more of the links being searched.

20. A method as recited in claim 18, wherein the method further comprises: presenting, by the administrative console, one or more rules associated with a selected one of the tasks, views, or links in a user interface; and presenting a control to allow a user to automate a rule of the one or more rules.

* * * * *